L. M. WEGNER.
DOUGH KNEADER.
APPLICATION FILED OCT. 2, 1915.
1,188,225.
Patented June 20, 1916.
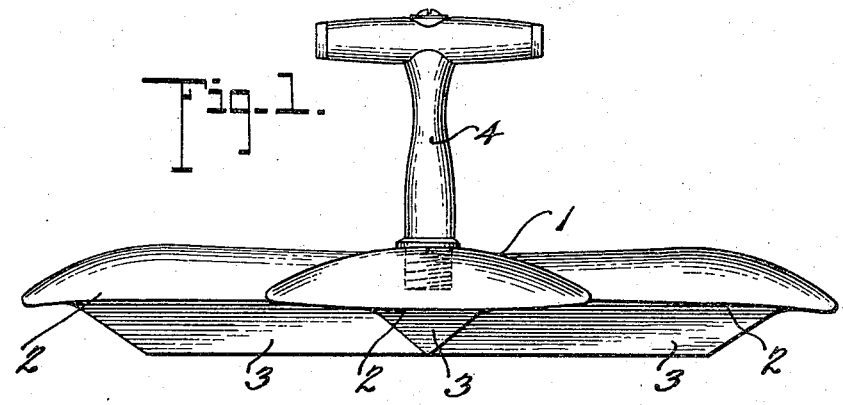
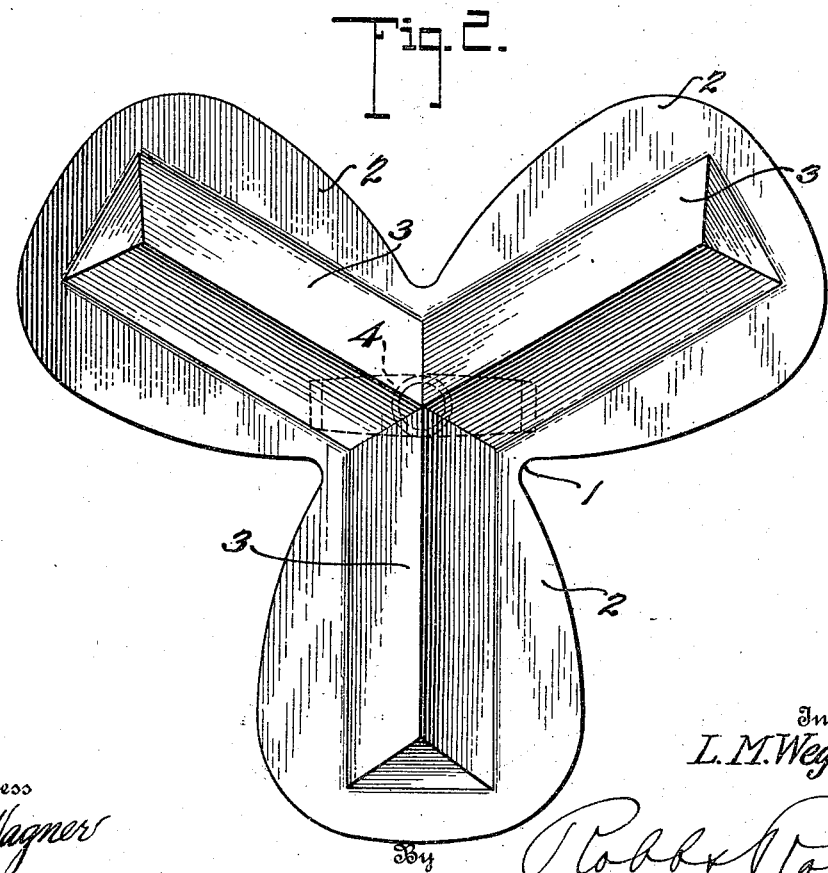
Inventor
L. M. Wegner

UNITED STATES PATENT OFFICE.

LOUISE M. WEGNER, OF WAUSA, NEBRASKA.

DOUGH-KNEADER.

1,188,225.  Specification of Letters Patent.  Patented June 20, 1916.

Application filed October 2, 1915. Serial No. 53,803.

*To all whom it may concern:*

Be it known that I, LOUISE M. WEGNER, a citizen of the United States, residing at Wausa, in the county of Knox and State of Nebraska, have invented certain new and useful Improvements in Dough-Kneaders, of which the following is a specification.

The present invention relates to improvements in dough kneaders, with the object in view of providing a simple article of manufacture, the operation of which is considerably facilitated by its special construction. To this end the device is constructed of a body composed of one or more arms or wings on the under surface of each of which is formed a cutting or dividing element designed to render easier the movement of the body into the mass of dough during the kneading operation.

With the above and other objects in view, this invention consists in the construction, combination and arrangement of parts all as hereinafter more fully described, claimed and illustrated in the accompanying drawing, wherein:

Figure 1 is a side elevation of a device constructed in accordance with my invention. Fig. 2 is a bottom plan view thereof.

Throughout the following detail description, and on the several figures of the drawing, similar parts are referred to by like reference characters.

Referring to the drawing, the numeral 1 designates the body portion of the device forming the subject matter of this invention, consisting, as shown in the drawing, of a plurality of laterally projecting arms or wings 2. These wings have their upper surfaces rounded off to the lateral edges and the bottom surfaces substantially flat. On the under surface and extending centrally and longitudinally of each of the wings is a rib 3 which is triangular in shape and is designed to form a dividing or cutting element. To the central portion of the body 1 is attached the operating handle 4 preferably of T-shape and screwed into said body so as to enable its detachment for cleansing the article or for other purposes such as convenient disposition in a small space.

It will be obvious from this description that the article is a simple one that may readily be manufactured at a minimum cost and its material may be wood or metal as found most desirable. In the operation, the kneader is pressed downwardly into the mass of dough material and its introduction into said material is facilitated by the dividing elements 3 on the wings. As a matter of fact these dividing members separate the dough very much in the same manner that the knuckles of the hand perform this operation in the manual kneading of dough material. The rounded upper surfaces of the wings enable the kneader to be withdrawn and the wings are designed with a view to accomplishing the kneading function as will be obvious to those skilled in the art to which this invention refers.

It will be understood that it is within the purview of this invention to construct the article hereinbefore described with a less or greater number of arms than that disclosed by the drawing but the use of three arms, as shown, is found to best perform the kneading operation.

Having thus described my invention, what I claim as new is:

1. A dough kneader comprising a body having a substantially flat under surface, a dividing element projecting from said surface and arranged longitudinally and wholly within the edges thereof, said projecting element being spaced from said edges whereby to produce spreading action of the material worked upon as the body passes thereinto, and a manipulating handle detachably connected to said body.

2. A dough kneader comprising a body consisting of a plurality of radially arranged spaced wings or arms of substantially flat formation on their under surfaces, the upper surfaces of each of said wings being rounded, a cutting rib formed on the under surface of each of said wings for facilitating the passage of the body into the material worked upon, said ribs joining centrally of the body and being materially narrower than the wings and merging into the surface from which they project, and means for manipulating the kneader.

In testimony whereof I affix my signature.

LOUISE M. WEGNER.

Copies of this patent may be obtained for five cents each, by addressing the "Commissioner of Patents Washington, D. C."